United States Patent

Brilman et al.

[15] 3,641,517

[45] Feb. 8, 1972

[54] SUPERCONDUCTIVE DATA STORAGE ARRANGEMENT

[72] Inventors: Michel Edmond Francis Brilman, Bruyeres-Le-Chatel; Jean-Pierre Alain Campagne, Antony; Guy Georges Gorinas, Saint-Michel-sur-Orge, all of France

[73] Assignee: Societe Alsacienne de Constructions Atomiques de Telecommunications et d'Electronique "Alcatel", Paris, France

[22] Filed: Jan. 9, 1970

[21] Appl. No.: 1,604

[30] Foreign Application Priority Data

Jan. 9, 1969 France ....................6900230

[52] U.S. Cl. ....................340/173.1

[51] Int. Cl. ....................G11c 11/44, G11c 5/02

[58] Field of Search ....................340/173.1

[56] References Cited

UNITED STATES PATENTS 3,389,384 6/1968 Jones et al. ....................340/173.1

3,460,101 8/1969 Sass et al. ....................340/173.1

3,452,333 6/1969 Ahrons ....................340/173.1

*Primary Examiner*—Stanley M. Urynowicz, Jr.

*Attorney*—Craig, Antonelli & Hill

[57] ABSTRACT

A superconductive device for the storage and the nondestructive reading of information or data, which has a minimum spatial requirement while assuring a practical and workable operation free from any parasitic signals including a storage arrangement having two portions which are positioned in close relationship with respect to each other, one of these portions providing a superconductive loop consisting of two superimposed layers of superconductive materials having different critical temperature points, one area thereof having one partially interrupted superconductive layer which allows this portion to readily lose the superconductive property thereof in the presence of a magnetic field, and the other portion also consisting of two superimposed semiconductive layers with one layer interrupted serving as a test conductor actuated by the field generated by the superconductive loop and a readout conductor.

10 Claims, 3 Drawing Figures

SUPERCONDUCTIVE DATA STORAGE ARRANGEMENT

The present invention relates to a superconductive data storage element and more particularly to a superconductive data storage arrangement having a large capacity and nondestructive reading capability. Moreover the present invention relates to a process for manufacturing a storage element of this type.

Superconductive or cryogenic storage devices are generally devices of the binary type consisting of elements which comprise a superconductive loop or ring in which the information is stored in the form of persistent currents. The two binary states or conditions may be represented either by the presence and absence of persistent currents in this loop, or by currents circulating in one direction and the opposite direction in the loop. In the latter case, an information "1" will be represented, for example, by a current flowing in this superconductive loop in the clockwise direction, whereas an information "0" will be represented by a current circulating in the counterclockwise direction.

A loop for storing persistent currents consists generally of two portions, the first one of which is made from a material which becomes readily resistant whereas the second portion remains superconductive. The storing of persistent currents in such a superconductive loop or ring is accomplished, for example, in the following manner: a current is applied to a so-called writing circuit which renders the first portion of the superconductive loop momentarily resistant. A digital pulse is applied to the circuit comprising the second part or portion of the loop that has remained superconductive. The current of the writing circuit which rendered the first portion of the loop resistant is then suppressed and the digital pulse is cut. The current is thereby closed in the loop which has again become totally superconductive.

The part of the loop that is susceptible to becoming resistant under the action of a writing current is made from a superconductive metal which is different from that of the loop or ring.

The nondestructive reading or interrogation of the storage loop is generally carried out by means of a conductor made from a superconductive material which is subjected to the magnetic field produced by the current in the loop in such a manner that the superconductive or resistive state or condition of the aforementioned conductor indicates the binary state in which the storage element finds itself.

The processes for manufacturing such storage devices employ different techniques which are well known and consist generally in depositing in several stages the superconductive metal or metals on a substratum by evaporation in vacuo; in making the circuits by photoengraving, and in insulating these circuits with respect to each other by means of insulating layers generally consisting of metal oxides, such as, for instance silicon and tantalum.

Storage devices of this type have several disadvantages and drawbacks. One of these drawbacks stems from the fact that the elementary cells of such storage arrangements must be disposed in a manner such that parasitic signals are eliminated. Furthermore, when it is desired to store data of significant quantity, one is forced to juxtapose a plurality of cells in the same plane and consequently to utilize relatively significant surface areas. For these two reasons it is evident that the assembly of these elementary cells in a storage of large capacity, which may reach $10^8$ to $10^9$ bits, leads one to assemblies which have a large volume and are difficult to integrate into the electronic apparatus in which they are to be set in operation.

A second drawback is due to the fact that in such storage devices the configuration of the conductors forming the reading circuits leads in general to relatively weak output signals. The difficulties of capturing such signals which result therefrom lead to difficulties in interpretation of the "bits" which have been recorded and even extend to the reading of errors. Furthermore, the necessity of obtaining symmetrical detection signals produces a significant loss of space on the substrata, which contributes again to the increase in the volume of the storage arrangement.

Moreover, the processes for manufacturing such cryogenic storage arrangements equally present a certain number of disadvantages and drawbacks. One drawback of such processes resides in the fact that the deposition and the etching of the metals making up the superconductive loop or ring are obtained in several steps or operation. The different operations required for such a technique lead to the appearance of appreciable contact resistances between these metals and consequently to the weakening and even to the loss of information which has been stored.

A further drawback is due to the fact that these processes require an increased time for preparation and operation and necessitate the employment of relatively qualified specialists. The high operating costs resulting therefrom lead to devices which are high in cost.

The present invention renders it possible to obviate all of the disadvantages and drawbacks outlined above and is concerned with, and directed to, a superconductive device for the storage and nondestructive reading of stored data, having a minimum required space while nevertheless assuring a practical and workable operation that is free from any parasitic signals. The present invention is equally concerned with and directed to a process for manufacturing such a device which allows for resolving the technological problems presented by the manufacture thereof, while nevertheless being characterized by a great simplicity of operation.

According to the present invention, the cryogenic device for the storage and the nondestructive reading of information consists of an arrangement of elementary storage cells connected to an addressing device, and grouped in a manner such that the circuits for energizing the storage loops and the test conductors are interconnected in columns, and the writing conductors and the reading conductors are interconnected in lines; each cell comprising a means for storing the information, consisting of a rectangular superconductive loop or ring made from two superconductive materials having critical temperatures different from each other, energized by a current pulse, a so-called digital pulse, means for writing and erasing data, consisting of a conductor which may be energized by a current pulse rendering resistant, by magnetic influence, a portion of this superconductive loop or ring, reading means consisting of a conductor energized by a current pulse, a so-called reading pulse, and a test conductor energized permanently by direct current, and adapted to be rendered resistant by the superposition of the magnetic field produced by a reading pulse and the magnetic field produced by the current circulating in the storage loop when the latter is being traversed by a permanent current.

A storage device in which the test conductor is disposed in a plane parallel to the plane of the storage loop and on the other side thereof with respect to the reading conductor is realized by means of two thin superimposed layers made from superconductive material having critical temperature points which are different from each other, forming two parallel bands reunited at one of the ends thereof by means of a very short perpendicular band portion, one of these two bands, the so-called inactive band, not having any interruption in continuity in the outer layer of the superconductive material, whereas in the other band, the so-called active band, the thin outer layer of superconductive material is partially interrupted for allowing this band to lose its superconductive property in the presence of a magnetic field.

According to a first embodiment of the device proposed by the present invention, the superconductive materials constituting the circuits for the storage of the information, on the one hand, the reading conductors energized with direct current, on the other hand, and rendered resistive, respectively, at the time of the operation for storing the information and at the time of reading thereof are identical and have identical superconductive properties.

According to a second embodiment of the device according to the present invention, which assures an important margin of operation, the superconductive metals constituting the circuits for the storage of the information, on the one hand, and the reading conductors energized with direct current, on the other hand, and rendered resistive, respectively, at the time of the operation for storing the information and at the time of reading thereof are identical, but have a different structure and different superconductive properties.

The process for manufacturing the device as proposed by the present invention consists of successively depositing by evaporation in vacuo the metal and/or metals constituting the circuits on the substratum thereof; in the course of the same evaporation cycle the metal designed to be rendered resistive by the magnetic field is evaporated first and for this reason is entirely covered by the other metal which is evaporated subsequently;

obtaining these circuits by photoetching the metal and/or metals with the aid of, on the one hand, a photoresistant product and, on the other hand, specific chemical agents adapted to react with either this group of metals, or selectively one of the metals while not having any reaction with respect to the other; and insulating the respective circuits by means of two superimposed photoresistant layers, a first viscous layer having a great covering power and a second more fluid layer assuring the protection of this first layer, the development of these layers being carried out by means of the diluents thereof.

These superconductive storage devices proposed by the present invention afford several advantages. One of these advantages stems from the fact that the arrangement or provision of the different circuits in the adjoining parallel planes results in a significant reduction of the volume of the arrangement of elementary cells constituting the system. The result thereof is that the large-capacity storage system comprising cells having the configuration as described afford a minimum amount of required space while assuring, however, a high number of "bits" per unit of volume.

A second advantage of the storage device proposed by the present invention results from the fact that the reading circuit obtains with the superconductive loop a configuration that leads, on the one hand, to output signals having strong amplitudes being readily detectable and affords, on the other hand, the possibility of effecting a symmetrical detection so as to eliminate the common mode without necessitating the complexity of an elaborate layout.

A further advantage of the present invention results from the fact that the process which is utilized in the manufacture of this type of storage cell particularly makes possible the etching of superconductive loops of very small dimensions having minimal self-inductance coefficients. The small time constant which results therefrom allows for the possibility of integrating these storage arrangements into devices wherein a rapid response must be assured.

Additionally, the manufacturing process for these storage arrangements proposed by the present invention has a certain number of complementary advantages. One of these advantages consists in that, on the one hand, the evaporation of the metals and the depositing thereof on the substrata are obtained in a signal operation and that, on the other hand, these metals are etched by means of specific agents. Consequently, the contact resistances between these metals are nil, which eliminates particularly any risk of a loss of the stored information.

Yet another advantage results from the fact that establishing the insulation between circuits from layers photoresistant products avoids certain attendant operations, such as thermal treatment at high temperatures, inherent in refractory products conventionally used.

Another advantage resides in the fact that such a manufacturing process is characterized by a great technological simplicity together with a great speed of operation. Hence, the manufacture may be carried out by a reduced number of personnel who do not need to have special qualifications, which further reduces the cost of manufacture.

Further characteristics and advantages of the present invention will become more readily apparent from the following description taken in connection with the accompanying drawing, wherein FIG. 1 is a top plan view of a storage cell or element according to the present invention;

Figure 1:
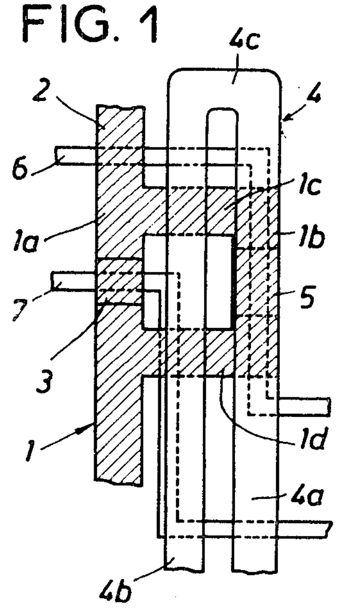

According to FIG. 1, a storage cell or element as proposed by the present invention essentially comprises a superconductive loop 1 made from layer of superconductive metals, such as lead and tin, the tin layer being covered by the lead layer. This loop 1 comprises two longitudinal branches 1*a* and 1*b* which are interconnected by means of two transverse branches 1*c* and 1*d*, and is further connected to the neighboring loops by means of a conductor 2, a so-called digit conductor, which assures the energization of the aforementioned loop 1 by application of pulses thereto. On the branch 1*a*, an area 3 of the lead layer has been removed to allow merely the tin to be present. Disposed above the superconductive loop 1 is a test conductor 4 which has a U-shaped configuration and consists of two parallel bands 4*a* and 4*b* reunited with each other by means of a band or portion 4*c*, the band 4*a* being arranged above the branch 1*b* of the loop 1. On the branch 4*a* of the test conductor 4, an area 5 of the lead layer has been removed to allow merely the tin to be present. Furthermore, a writing conductor 7 and a reading conductor 6 are disposed parallel to the other surface of the superconductive loop 1.

Figure 2:
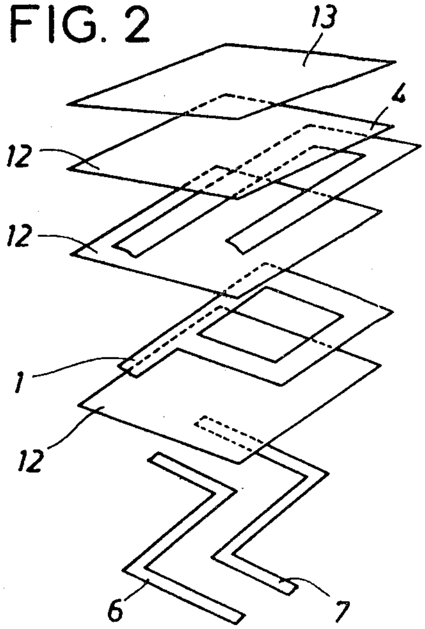
FIG. 2 is an exploded view of this storage cell or element.

FIG. 2 illustrates more distinctly the arrangement or provision of the circuits and conductors are described in connection with FIG. 1. Particularly apparent therefrom is the superconductive cell 1 disposed between the U-shaped test conductor 4 and the reading and writing conductors 6 and 7. The insulation between these different circuits is accomplished by means of insulating layers 12, whereas a superconductive layer 13 may be connected to ground, thus assuring the shielding of this unit.

As indicated above, both the superconductive cell 1 and the U-shaped test conductor 4 may be formed of superimposed layers of tin and lead, except for the areas 3 and 5, which consist only of tin. Also, as seen in FIG. 1, the conductors 6 and 7 are oriented so as to be in registration with the areas 5 and 3, respectively, at least at one part thereof so that the field generated by the conductors 6 and 7 is capable of influencing the resistance of the areas 5 and 3.

This storage element operates in the following manner:

The storage or writing operation is effected by first sending a current through the writing conductor 7 which has the effect of generating a field which renders the zone 3 of the loop 1 resistant. Thereafter, in case it is desired to proceed with the storing of a binary "1", for example, a digit pulse is sent through the conductor 2. The current being thus injected makes use of the superconductive path constituted by the branches 1*c*, 1*b* and 1*d* of the loop 1; thereafter one proceeds with the successive interruption of the current in the writing conductor 7 and of the digit pulse, which brings about the closing of the loop through branch 1*a* since the area 3 again becomes superconductive with interruption in the current in conductor 7 and consequently the current is trapped in the loop. It should be noted that the magnetic field produced by the current being thus trapped is not of sufficient magnitude in itself to render the zone 5 of the test conductor 4 resistant.

In case it is desired to store a binary "0", one merely refrains from sending a pulse into the loop 1 by means of the digit conductor 2, and as a result thereof, no persistent current will be trapped in the loop 1.

For the purpose of proceeding with the reading operation, a current pulse is applied to the conductor 6 so that the test conductor 4 is traversed by a direct current induced by the field generated by the current in conductor 6.

In case a persistent current corresponding to a binary "1" has remained trapped within the loop 1, the addition of the magnetic field produced by this current to the field generated by the reading current is sufficient to generate a current in the conductor 4 which renders the zone 5 of the band 4*a* of the test conductor 4 resistant, hence the appearance of a voltage at the terminals of this conductor 4.

Conversely, in a case where no persistent current is found to be trapped in the loop 1, which corresponds to a binary "0", the magnetic field produced by the current circulating in the circuit 7 is not sufficient to render the zone 5 of the band 4*a* of the test conductor 4 resistant, and as a consequence thereof, no voltage drop can be detected at the terminals of the aforementioned conductor 4.

Furthermore, in order to proceed with the erasing of data stored in the superconductive loop 1, it suffices to render resistant the portion 3 of the loop 1 by applying a pulse to the writing conductor 7. The current stored in the loop 1 is then dissipated in the resistance thus created by area 3 losing its superconductivity.

Figure 3:
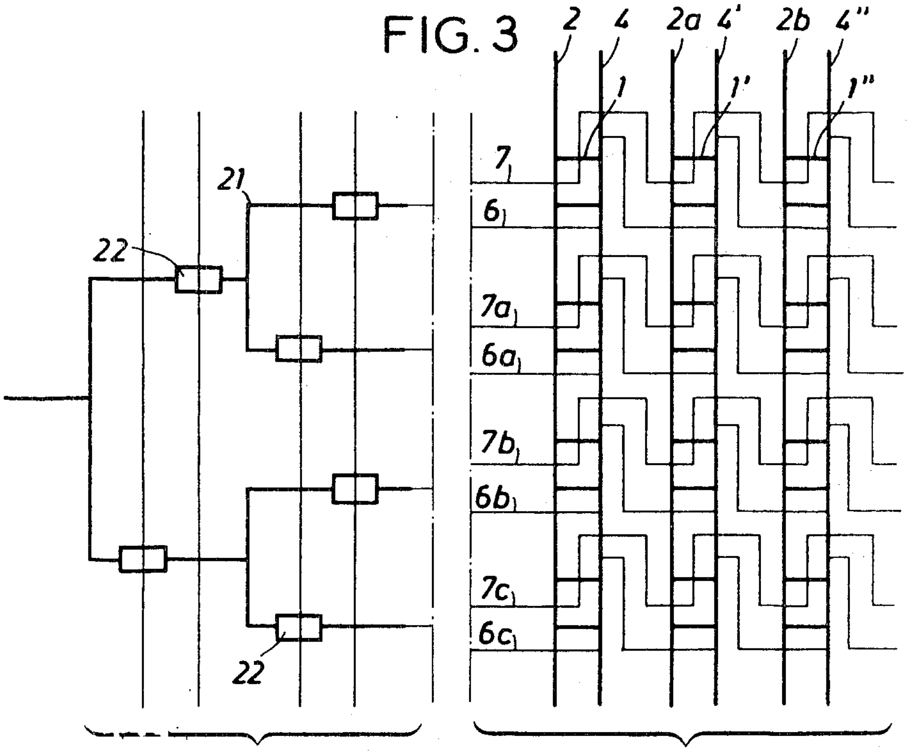
FIG. 3 illustrates an assembly of cells or elements in a plane-storage arrangement.

According to FIG. 3, the assembly of elementary cells into a storage system in conformity with the present invention essentially comprises superconductive loops 1, 1' and 1'' disposed in columns and connected with each other by means of digit conductors 2, 2*a* and 2*b*, whereas the test conductors 4, 4' and 4'' shown schematically by straight lines are disposed above the branch 1*b* of these loops so as to be electrically insulated therefrom. The reading conductors 6, 6*a*, 6*b* and the writing conductors 7, 7*a* and 7*b* are arranged in meander lines across the storage arrangement so as to register with the proper points on digit conductor 2, 2*a* and 2*b* and test conductors 4, 4' and 4'', as seen in FIG. 1. The ensemble is energized by an addressing device, such as the device 21 known per se, which may consist, for example, of a selection cryotron shaft, such as 22.

By way of example which is not to be construed as limitative in any way, if it is desired to store in the upper line or row of such a storage system, for example, the binary word 101, the writing circuit 7 and then the digit conductors 2 and 2*b* are energized, while the conductor 2*a* is not energized. Thereafter the current in the circuit 7 and the digit pulse applied to conductors 2 and 2*b* are successively interrupted, which produces the appearance of persistent currents turning in the cells 1 and 1'' only.

One may then proceed with the nondestructive reading of this word by sending a current through the reading circuit 6. The magnetic field produced by this current cooperates with the field induced by the persistent currents in the loops 1 and 1'' for rendering the test circuits 4 and 4'' resistant. A signal appears consequently at the terminals of the resistive zones of these circuits situated in the neighborhood of the loops 1 and 1'', whereas no signal appears at the terminals of the test circuit 4'. Moreover, if it is desired to proceed with the erasing of the work which has been recorded and read in this manner, it suffices only to send a current through the writing conductor 7.

The operation of the other rows and columns of the storage system is identical in all other respects to that which has been described above.

The process for manufacturing the storage system proposed by the present invention consists, for each layer of circuits, depositing successively and uniformly the metal and/or metals on the substratum by evaporation in vacuo; chemically etching this deposit by means of appropriate chemical etching agents, and electrically insulating the circuit having been thus etched. Depositing by evaporation of the metal and/or metals on the substrata thereof is accomplished in vacuo in a manner known per se in crucibles heated by the Joule effect, for example.

In the case of conductors 6 and 7 consisting of lead, only this metal is deposited whereas, with a view toward obtaining storage and test circuits 1 and 4, one carries out first an initial deposit of tin, and thereafter a deposit of lead in a single operation.

A modified embodiment of this method of obtaining the deposit envisages the realization of storage cells which have an important margin of operation in accordance with the second embodiment of the device proposed by the present invention. It consists in controlling the conditions of depositing the tin when manufacturing the test conductors 4 to vary the conditions in a reproducible fashion and in a manner such that a layer is obtained which has a structure and a microcrystalline orientation different from those of the tin layer provided for the superconductive loops 1. Such a variation of the depositing conditions makes it possible to obtain tin layers which display similar yet different critical temperatures and assure, by this very fact, the important margins of operation of the storage cells and the advantages resulting therefrom.

The formation of the circuits can also be accomplished through use of a photographic method known per se which will therefore not be described in detail herein.

The chemical etching of the circuits thus defined is then effected by means of solutions whose chemical composition is adapted to the metal and/or metals forming the layer to be etched. Thus, in the case of the circuits consisting exclusively of lead, the etching solution used is the so-called 1Pb solution, which comprises by volume:

20 parts hydrogen peroxide at 110 volumes
80 parts acetic acid
20 parts water.

In the case of circuits consisting both of lead and of tin, such as the superconductive loops 1 and the test circuits 4 through which flows a direct current, one proceeds first with the simultaneous etching of tin and lead either by means of an agent such as the solution "Dynachem S 300", or by means of an aqueous solution of nitric acid.

Thereafter, the selective etching of the lead on the thus defined circuit is carried out by means of a solution, the so-called 3Pb solution, whose volumetric composition contains 80 parts hydrogen peroxide at 110 volumes
20 parts acetic acid
20 parts water.

Furthermore, the selective etching of the tin is assured by a solution, the so-called 3 Sn solution, whose volumetric composition is 20 grams oxalic acid
80 cm.$^3$ water
20 cm.$^3$ hydrogen peroxide at 110 volumes.

Instead of eliminating from the substratum lead and tin at the same time, it is also possible to proceed with the successive elimination of these two metals by means of the specific solutions thereof mentioned above.

At the end of these operations, one etches on the superconductive loops 1 and on the test conductors 4 having been thus defined the tin zones 3 and 5 by eliminating the lead which covers the same. For this purpose, one proceeds with the definition of these zones by means of a plating or covering of a photoresistant product and one assures the etching thereof by means of the solution 3Pb.

A modified embodiment of the process of etching such circuits consisting of tin and lead resides in eliminating any lead at the time of the first etching operation by means of the solution 3Pb. One may then proceed with the etching of the tin either by means of the solution "Dynachem S 300", or by using nitric acid.

The circuits defined and etched in this manner are thereupon electrically insulated with respect to each other by means of layers of photoresistant products of the negative type, as manufactured by Kodak, each insulating layer consisting of two coatings; the first one of these being a very viscous photoresistant product having a large covering capacity, such as the product "K.T.F.R.", while the second such coating consists of a more fluid and less moistening photoresistant product, namely the product "K.P.R.", which plays the role of a barrier during a second spreading of the "K.T.F.R.", thus avoiding any alteration of the first coating by the second one.

Additionally, each coating is developed after exposure to ultraviolet rays in its own diluent, and thus not in its developer, due to the mutual compatibility of these diluents and the reciprocal incompatibility of the above-mentioned developers.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What we claim is:

1. A cryogenic storage cell for storing a bit of binary data for nondestructive read-out comprising
a superconductive loop capable of carrying a recirculating current pulse,
writing circuit means for selectively generating a magnetic field engaging one portion of said superconductive loop so as to render said portion nonsuperconductive,
superconductive output circuit means having one portion magnetically coupled to a second portion of said superconductive loop, and
reading circuit means energized by a direct current for selectively generating a magnetic field engaging said one portion of said output circuit means,
said one portion of said output circuit means having such a critical temperature coefficient as to be rendered nonsuperconductive only when subjected to magnetic fields simultaneously from said superconductive loop and said reading circuit means, wherein said superconductive loop is made from first and second superimposed layers of superconductive materials having different critical temperatures, and wherein said one portion of said superconductive loop is formed of only one of said first and second superimposed layers of superconductive materials.

2. A cryogenic storage cell as defined in claim 1, wherein said superconductive output circuit is formed of first and second superimposed layers of superconductive materials having different critical temperatures, and wherein said first layer of said superconductive loop is made of the same material as the first layer of the superconductive output circuit but the microcrystalline orientation in the respective layers is different thereby providing different critical temperature coefficients for the respective layers.

3. A cryogenic storage cell as defined in claim 2, wherein said first and second layers of said superconductive output circuit are made of tin and lead.

4. A cryogenic storage cell as defined in claim 3, wherein said one portion of said superconductive output circuit is formed only of a layer of tin.

5. A cryogenic storage cell as defined in claim 3, wherein said one portion of said superconductive output circuit is formed of only one of said first and second layers of superconductive materials.

6. A cryogenic storage cell as defined in claim 1, wherein said superconductive output circuit is formed of first and second superimposed layers of superconductive materials having different critical temperatures.

7. A cryogenic storage cell as defined in claim 6, wherein said first and second layers of said superconductive output circuit are made of tin and lead.

8. A cryogenic storage cell as defined in claim 7, wherein said one portion of said superconductive output circuit is formed only of a layer of tin.

9. A cryogenic storage cell as defined in claim 6, wherein said one portion of said superconductive output circuit is formed of only one of said first and second layers of superconductive materials.

10. A cryogenic storage system for storing a plurality of bits of binary data for nondestructive readout comprising a plurality of storage cells arranged in rows and columns in a single plane,
each cell comprising a superconductive loop capable of carrying a recirculating current pulse, writing circuit means for selectively generating a magnetic field engaging one portion of said superconductive loop so as to render said portion nonsuperconductive, superconductive output circuit means having one portion magnetically coupled to a second portion of said superconductive loop, and reading circuit means for selectively generating a magnetic field engaging said one portion of said output circuit means, said one portion of said output circuit means having such a critical temperature coefficient as to be rendered nonsuperconductive only when subjected to magnetic fields simultaneously from said superconductive loop and said reading circuit means,
said superconductive loops in each column being connected in series, said output circuit means in each cell being formed by a respective strip extending continuously along each column of superconductive loops and is positioned in close proximity to each loop in the column, and said reading circuit means including a plurality of symmetrical serpentine reading conductors extending across said columns of cells at the level of each cell thereof with a portion superimposed over a corresponding portion of each loop which it traverses.

* * * * *